Feb. 6, 1962 R. A. McCREANOR ETAL 3,020,033
INSPECTION AND CONTROL SYSTEM
Filed July 15, 1959 5 Sheets-Sheet 1

INVENTORS
Richard A. McCreanor, Russel L. Uphoff,
John F. Laycak, Rudolph S. Libenschek.
BY
ATTORNEY

Fig.2

United States Patent Office 3,020,033
Patented Feb. 6, 1962

3,020,033
INSPECTION AND CONTROL SYSTEM
Richard A. McCreanor, Pittsburgh, Russel L. Uphoff, Murrysville, John F. Laycak, Duquesne, and Rudolph S. Libenschek, Pittsburgh, Pa., assignors to Jones & Laughlin Steel Corporation, Pittsburgh, Pa., a corporation of Pennsylvania
Filed July 15, 1959, Ser. No. 827,315
23 Claims. (Cl. 266—23)

This invention relates to a method and apparatus for detecting defects on the surface of a body and for integrating the combined areas of the defects over a predetermined surface area of the body to actuate a device for removing the defects when their combined areas exceed a certain limit. More particularly, the invention relates to an inspection and control system utilizing an electron-optics device for electronically scanning the image of the surface of a body to produce an electrical signal indicative of the surface condition of the body being scanned.

Although not limited thereto, the present invention is particularly adapted for use with an automatic hot scarfing machine for steel slabs, billets and the like. When steel is hot rolled from the ingot to a semifinished form, a variety of ingot defects and some defects arising during heating or rolling may be carried through to appear on the surface of the semifinished product. Such defects include cracks, scabs, seams and folds. If the more serious of these defects are not at least partially removed, they are carried through to the finished form, resulting in an inferior product.

In the usual automatic hot scarfing operation one or more gas cutting torches or scarfing heads are located adjacent the respective sides of an irradiant hot slab or billet as it travels along a conveyor, the arrangement being such that the torches will remove an entire layer of the surface of the workpiece as it passes thereby. Generally, the scarfing heads remove about 1/16 inch from the surface of the workpiece which is sufficient to remove the defects referred to above; but since the scarfing heads are operated continuously, the entire surface of the workpiece is removed, resulting in a 2% or higher metal loss. In a 25,000 pound slab, for example, removal of a 1/16 inch layer of metal from all four sides causes a metal loss of about 500 pounds or 2.3% of the total weight. This is a wasteful process since only those portions of the slab containing defects need be removed. Therefore, it is highly desirable to remove only the defective portions to thereby decrease the metal loss occurring during the scarfing operation.

The present invention has as its principal object the provision of a method and apparatus for detecting defects over a predetermined area of the surface of a metal workpiece, and for integrating the combined areas of these defects to produce an indicating signal and/or actuate means for removing the defects when their combined areas exceed a predetermined limit.

More specifically, an object of the invention resides in the provision of automatic hot scarfing apparatus for removing only the defective portions of the surface of an irradiant hot metal body whereby an appreciable increase in yield is achieved. As will become apparent from the following description, a hot steel slab is irradiant, meaning that it glows or gives off light. Furthermore, defects on the surface of the slab appear brighter or darker with respect to the remainder of the surface. Protrusions appear darker since they are cooler than the remainder of the surface, whereas holes or indentations appear brighter since they are hotter. This factor is utilized in the present invention in detecting the defects and integrating their total area over a given sector of the surface of the slab.

In accordance with the invention, a photosensitive device such as a vidicon is located ahead of a scarfing head along a conveyor and is utilized to scan the image of the surface of a moving irradiant body along a fixed line extending substantially perpendicular to the direction of movement of the body. In this manner, the electron beam of the photosensitive device produces a video signal in which a relatively long pulse is produced for each scan of the electron beam, this pulse being produced as the beam scans across the image of the irradiant surface of the body. Superimposed on this long pulse are positive or negative short pulses which arise when the electron beam scans over the image of a defect, the width of each pulse being proportional to the width of the defect it represents. In this manner, a positive pulse is produced when the beam scans over a defect image such as a hole having a greater light intensity than the remainder of the surface, while a negative pulse is produced by a defect image such as a seam having a lower light intensity. Means are provided for eliminating all but the positive and negative short defect pulses in the video wave shape which are thereafter converted to one polarity. At least part of these resultant pulses are then used to trigger an oscillator which feeds a high frequency oscillatory signal to a counter only during the successive durations of the short pulses in the signal.

It will be apparent that since the electron beam of the photosensitive device scans over a single fixed line at a constant sweep rate, the total surface area scanned by the beam is a function of the speed of the body. Accordingly, means are provided for measuring this speed and for passing only a portion of the short defect pulses to the oscillator, this portion being proportional to speed. Thus, if the body is traveling rapidly, a greater number of short defect pulses will be fed to the oscillator over a given time interval than will be fed over this same time interval when the speed of the body is decreased. In any event, the number of pulses fed to the oscillator will always be the same for a given defect area regardless of speed.

The counter referred to above is essentially a device for producing an output voltage when the total area of the defects reaches a predetermined limit. That is, when the total number of oscillations fed to the counter during successive pulse intervals reaches a given amount, the counter will produce an output voltage which is used to turn on the scarfing head. Means are also provided for resetting the counter after the body has moved over a certain distance, say, one foot. Thus, if the number of oscillations representing the total defect area fed to the counter does not reach the aforesaid given amount during one foot of travel, the counter will be reset before producing an output voltage; and that particular one foot length of the body will not be scarfed. In this manner, in the absence of an exceptionally large protrusion, only those portions of the body having a predetermined total defect area will be scarfed in response to an output voltage from the counter.

Another object of the invention is to provide means in a system of the type described above for removing a defect producing a deep, negative pulse in the wave form regardless of the total defect area scanned over a particular increment of area of the slab. Such defects might, for example, be a large scab or other protrusion which must be removed regardless of the total number of defects in the area surrounding it. Accordingly, the invention provides means for overriding the usual control circuitry and for actuating the scarfing head when such a defect occurs.

The above and other objects and features of the invention will become apparent from the following detailed description taken in connection with the accompanying drawings which form a part of this specification and in which.

*General overall description of invention*

Figures 1A, 1B, 1C, 8:
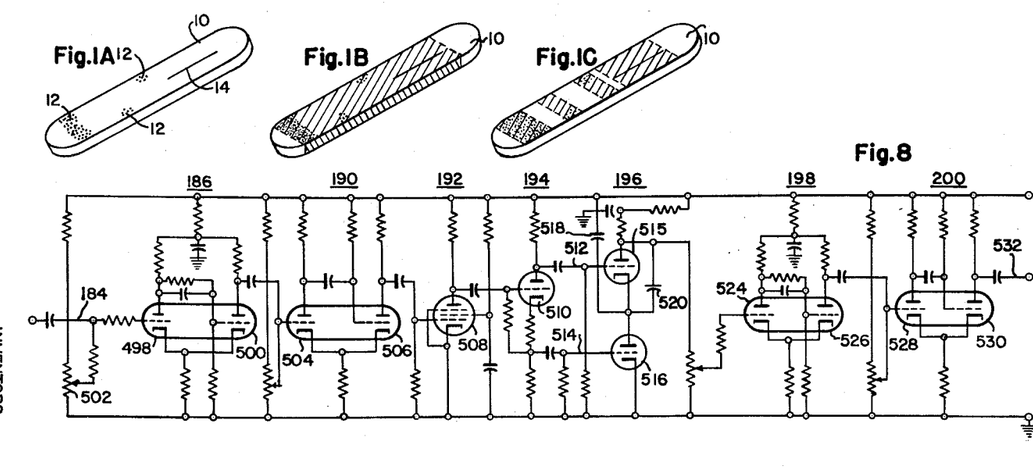
FIGURES 1A, 1B and 1C are illustrations of the effect of selective scarfing as compared with the ordinary scarfing procedure.
FIG. 8 is a detailed schematic diagram of the override circuit for deep, negative defects shown in FIG. 2.

Referring to FIG. 1, 10 represents a slab on which are several scabs 12 and a seam 14. FIG. 1B shows the usual method of hot scarfing used to eliminate the defects. Note that the entire shaded area is scarfed, while only certain portions of the surface contain defects. This, of course, results in an unnecessary loss of metal as was explained above. FIG. 1C illustrates the effect of the selective scarfing process of the present invention wherein only the defective, shaded areas are scarfed while the remainder of the slab is untouched. It is thus apparent that since only a portion of the surface of the slab has been burned, the metal loss resulting from the scarfing operation is appreciably reduced.

Figure 2:
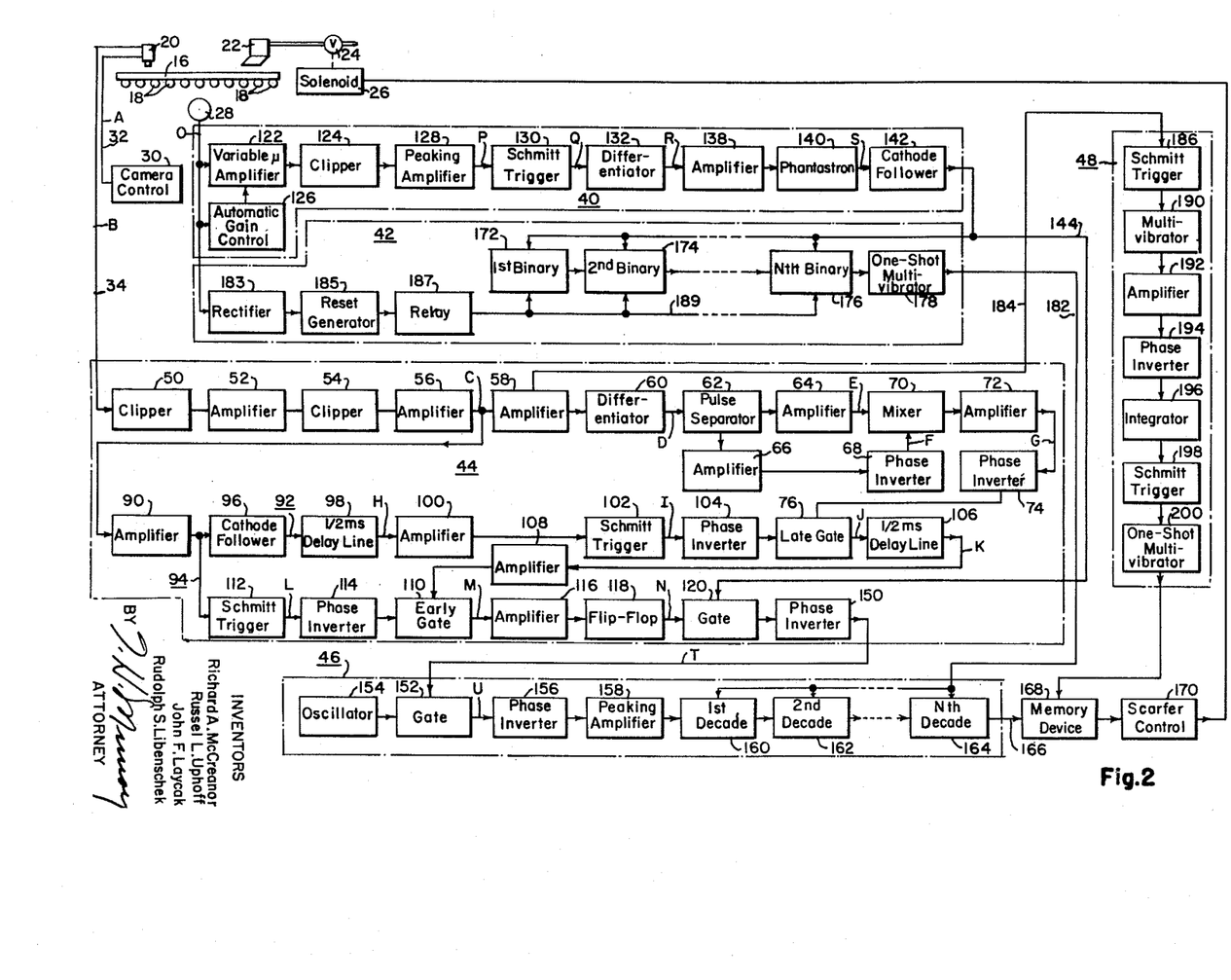
FIG. 2 is a block diagram of the overall control system of the present invention.
Figure 3:
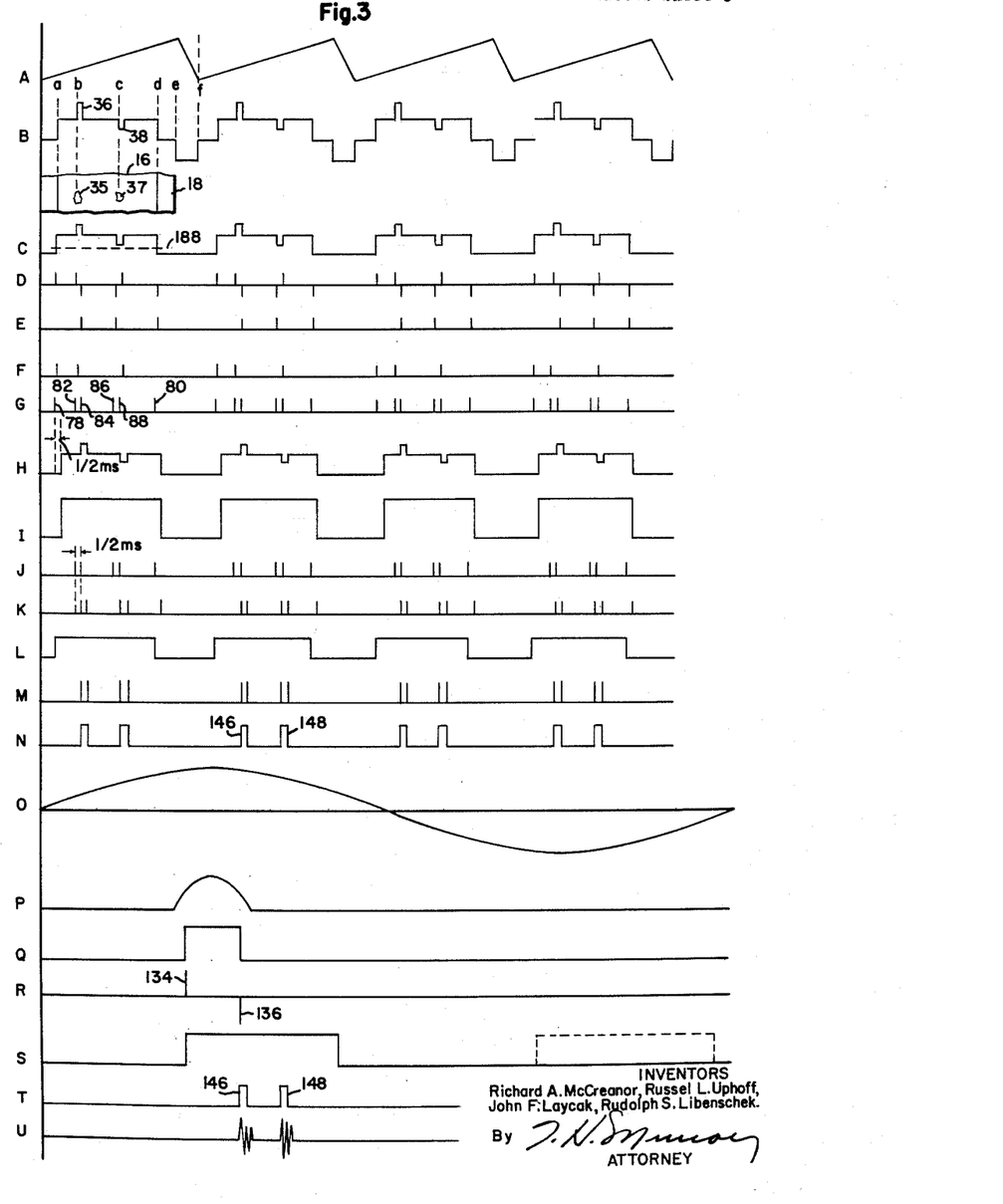
FIG. 3 is an illustration of wave forms appearing at various points in the circuit of FIG. 2.

Referring to FIGS. 2 and 3, a slab 16 is illustrated as passing over a series of conveyor rolls 18. Above the slab is a vidicon tube 20 adapted to scan over a single fixed line which extends substantially perpendicular to the direction of movement of slab 16. Following vidicon 20 is a scarfing head 22 which is controlled by means of a valve 24 or other similar device actuated by an electrical utilization device, such as a solenoid 26. Although only one vidicon tube and one scarfing head are illustrated in FIG. 2, it should be understood that a plurality of tubes and scarfing heads could be provided for each side of the slab; and, of course, the control circuitry hereinafter described would have to be duplicated for each tube and scarfing head combination.

As illustrated in FIG. 2, one of the conveyor rolls 18 is connected through a mechanical linkage to a tachometer 28, although any means could be used to actuate the tachometer which has a rotational speed proportional to the linear speed of the slab 16. A camera sweep generator and control circuit 30 is provided to produce the sawtooth wave form A shown in FIG. 3. This wave form is a series of rising current excursions which cause the electron beam of the vidicon to sweep across the surface of the slab and then return to its initial position during a dwell time when the wave form A returns to its initial current level. The wave form A is fed to the vidicon 20 through lead 32 while the video wave form, illustrated as wave form B in FIG. 3, appears on lead 34. As shown in FIG. 3 this video wave form is a series of relatively long pulses having superimposed thereon short pulses indicating the presence of defects. Thus, it will be apparent from FIG. 3 that as the electron beam sweeps from one side of the conveyor to the other, it will first scan the dark background portion of the conveyor until it reaches point *a* which is the edge of the irradiant slab 16. After intersecting the edge of the slab, the voltage of the video wave form increases because of the greater light intensity of the slab. At point *b* the electron beam intersects a defect 35 having a greater light intensity than the remainder of the slab. Consequently, a positive pulse 36 is produced in the wave form. At point *c* the electron beam again intersects a defect 37, but in this case the defect has a lesser light intensity than the remainder of the slab; and, consequently, a negative short pulse 38 is produced in the wave form. Finally, at point *d* in the wave form the electron beam leaves the edge of the slab and the voltage decreases due to the dark background of the conveyor. Between points *e* and *f* the electron beam returns to its original starting position over a very short interval of time, and the cycle is repeated.

The control circuitry of FIG. 2 may be divided into several portions, each of which is enclosed by broken lines. Thus, the block diagram includes variable sweep repetition rate circuitry 40, a displacement detector 42, deundulating and pedestal removing circuitry 44, a defect integrator 46 and an override circuit for deep, negative defects 48. Each of these portions will hereinafter be separately described in detail.

Turning now to FIG. 2, from lead 34 the wave form B is passed through a first clipper 50 and amplifier 52 to a second clipper 54 and a second amplifier 56. The function of the first clipper 50 is to remove the lower portion of the video wave form B so that only the pulse between points *a* and *d* remains. Circuit 52 amplifies the wave form and clipper 54 further refines the clipping action so as to insure that clean pulses of high amplitude appear at the output of amplifier 56. These pulses, then, appear as wave form C in FIG. 3. This wave form is passed through still another amplifier 58 to a differentiator 60 which produces a sharp spiked pulse of positive polarity when the input wave form C changes in a positive direction and a sharp spiked pulse of negative polarity when the input signal level changes in a negative direction. The output of the differentiator thus appears as wave form D in FIG. 3. This wave form is fed to a pulse separation circuit 62 which separates the positive pulses in wave form D from the negative pulses. The negative spiked pulses are fed through amplifier 64 wherein they are inverted to appear as the positive pulses in wave form E of FIG. 3. In a similar manner, the positive spiked pulses form separation circuit 62 are fed through amplifier 66 and phase inverter 68 such that the pulses in wave form F appearing at the output of the phase inverter correspond to the original positive spiked pulses in wave form D. The spiked pulses in wave forms E and F are then fed to a mixer 70 where they are combined to produce a series of positive spiked pulses in wave form G, with each pulse corresponding to the leading or trailing edge of a pulse in wave form C. The net effect of circuits 62—70, therefore, is to convert all of the spiked pulses in wave form D to one polarity. These spiked pulses are then passed through amplifier 72 and phase inverter 74 to a late gate circuit 76.

From an examination of wave form G in FIG. 3, it will be seen that spiked pulse 78 corresponds to the leading edge of the pulse produced at point *a* when the electron beam strikes the edge of the slab, while spike pulse 80 is that produced when the electron beam intersects the other edge of the slab at point *d*. Pulses 82 and 84, however, correspond to the leading and trailing edges of the pulse 36 produced by defect 35; while pulses 86 and 88 correspond to the leading and trailing edges of the pulse 38 produced by defect 37. It is desired to integrate only the distances between the respective spiked pulses originating at the leading and trailing edges of pulses 36 and 38 produced by defects, such as the distance between pulses 82 and 84 and that between pulses 86 and 88. Consequently, the pulses 78 and 80 due to the leading and trailing edges of the relatively long pulses in the video wave form must be eliminated.

To this end, circuitry is provided including an amplifier 90 to which wave form C from amplifier 56 is fed. The output of amplifier 90 is divided between two channels 92 and 94. Channel 92 includes a cathode follower stage 96, a delay line 98, amplifier 100, Schmitt trigger circuit 102, and phase inverter 104. After passing through delay line 98, the video wave form is delayed by ½ microsecond and appears as wave form H in FIG. 3. The delayed wave form, after passing through amplifier 100, is used to trigger the multivibrator or Schmitt trigger circuit 102 so that the output of phase inverter 104 appears as wave form I which is a series of pulses all having a width proportional to the width of the slab 16, but delayed by ½ microsecond with respect to the original video wave form. The inverted wave form I is then passed to the late gate 76 along with wave form G from phase inverter 74. Late gate 76 will produce an output signal when, and only when, there is a coincidence of pulses in wave forms I and G. From an inspection of these wave forms in FIG. 3 it will be seen that they coincide to pass all pulses except pulse 78 due to the leading edge of the slab 16. The ½ microsecond delay imparted by delay line 98 is just enough to eliminate this pulse and, of course, should be kept as small as possible so as not to eliminate any defect pulses which might occur very close to the edge of the slab.

With the pulse 78 removed, the output from late gate 76 appears as wave form J in FIG. 3. This wave form is passed through a second ½ microsecond delay line 106 and amplifier 108 to an early gate circuit 110. The wave form K arriving at the early gate 110 is as shown in FIG. 3 wherein all of the original spiked pulses in wave form G except pulse 78 remain.

The output of amplifier 90 in channel 94 is first fed through a Schmitt trigger multivibrator 112 which produces wave form L at the output of phase inverter 114. The inverted wave form L and wave form K from amplifier 108 are fed to the early gate 110 which functions in a manner similar to gate 76 in that it will pass output signals only upon coincidence of a pulse in wave form L with one in wave form K. It can be seen from FIG. 3 that since wave form K has been delayed by ½ microsecond while wave form L has not, the spiked pulses 80 extend beyond the trailing edges of the pulses in wave form L and, therefore, do not appear at the output of early gate 110. The wave form M at the output of early gate 110 will, therefore, be only the spiked pulses 82—88 produced by the leading and trailing edges of the defect pulses 36 and 38 in the original video wave form B. These pulses are fed through amplifier 116 to a flip-flop or multivibrator 118 which is alternately triggered on and off by successive spiked pulses from amplifier 116. Thus, the output of flip-flop 118 appears as wave form N in FIG. 3 and comprises a series of delayed pulses each of which has a phase position and pulse width corresponding to the phase position and pulse width of the original defect pulses 36 and 38 in the video wave form. Wave form N is then fed to the input of a gating circuit 120.

Reverting to the tachometer 28 at the upper left-hand portion of FIG. 2, its sine wave output appearing as wave form O in FIG. 3 is passed through a variable gain amplifier 122 to a clipper 124. Wave form O is also fed to an automatic gain control circuit 126 which produces a direct current voltage proportional to the average voltage level of the sine wave from tachometer 28. The output of circuit 126 is then fed to the variable gain amplifier 122 to control its output level.

The clipper 124 removes the negative half cycles of the sine wave from tachometer 28. The positive half cycles are passed to a peaking amplifier 128 which produces a relatively short pulse of large amplitude for each positive half cycle, this short pulse appearing as wave form P in FIG. 3. The wave form P is then used to trigger a Schmitt trigger multivibrator 130 which produces a square wave pulse appearing as wave form Q in FIG. 3. This square wave pulse is differentiated in differentiator 132 to produce spiked pulses 134 and 136 (wave form R) at the leading and trailing edges of the pulse in wave form Q. A clipper, not shown in FIG. 2, removes the negative pulse 136 while the positive pulse 134 is fed through amplifier 138 to a phantastron pulse generator 140. The pulse generator 140 will produce a pulse in response to trigger pulse 134 appearing as wave form S in FIG. 3. It will be noted that this pulse occurs once during each cycle of the sine wave from tachometer 28 and has a constant pulse width, this width being larger than the sweep pulse width. The wave form S is fed through cathode follower 142 and lead 144 to the gating circuit 120, previously referred to. Gate 120 will produce output pulses only upon coincidence of pulses in wave form N with the pulse in wave form S. Consequently, only pulses 146 and 148 in wave form N will be passed through gate 120 and will appear as wave form T after passing through phase inverter 150.

Wave form T comprising pulses 146 and 148 is then passed to gating circuit 152 which couples the output of a high frequency oscillator 154 to a phase inverter 156 and peaking amplifier 158 only during the time duration of pulses 146 and 148 from phase inverter 150. Thus, the output of peaking amplifier 158 will appear as wave form U which comprises two short periods of oscillation from oscillator 154 corresponding in phase and width to pulses 146 and 148. The oscillations in wave form U are passed through a series of decade counters 160, 162, etc. When the number of oscillations which are permitted to pass through gate 152 reaches a predetermined number, the last decade counter 164 will produce an output voltage on lead 166 which is fed to a memory device 168 which may, for example, comprise magnetic tape apparatus. After a specified delay period, the memory circuit 168 then passes the voltage produced by decade counter 164 through a scarfer control circuit 170 which actuates the electrical utilization device 26 to turn on scarfing head 22 for a predetermined length of the slab, which length is determined by a cam operated switch or other similar device connected to the shaft of tachometer 28.

Wave form S on lead 144 is applied not only to gating circuit 120 but also to a series of binary counting circuits 172, 174, etc. When a predetermined number of the pulses in wave form S are fed to the binaries, the last binary 176 will produce an output voltage which triggers one-shot multivibrator 178 to produce a pulse of fixed duration which is passed through a cathode follower, not shown, and lead 182 to each of the decade counters 160, 162, 164, etc. This pulse serves to reset each of the counters, meaning that if the total chain of counters is adapted to count a million oscillations before producing an output voltage and only a part of the million oscillations have been fed to the counter before the pulse on lead 182 is produced, then another million oscillations will have to be fed to the counter before it will produce an output voltage on lead 166.

It will be noted that the output of tachometer 28 is also fed to a rectifier 183, the output voltage of which is passed through a direct current amplifier or reset generator 185 to a relay 187. This relay, acting through lead 189, resets the binaries 172—176 in response to a direct current voltage from rectifier 183. Thus, when the leading edge of the slab 16 causes the roller connected to tachometer 28 to rotate, the binaries will be reset, insuring that counting begins at the aforesaid leading edge.

The output of amplifier 58 appearing as wave form C in FIG. 3 is also applied through lead 184 to a Schmitt trigger circuit or multivibrator 186 which will shift from one stable state to another when the input voltage exceeds a predetermined triggering level. This voltage is approximately that shown by dotted line 188 in FIG. 3 so that the multivibrator 186 will turn on and off in response to the leading and trailing edges of each pulse in the wave form C. These pulses are then fed to a one-shot multivibrator 190 which will produce output pulses in response to the pulses from multivibrator 186, with the pulses in this case having a fixed pulse width which is not dependent upon the width of the pulses in original wave form C. The output of multivibrator 190 is then fed through amplifier 192 and phase inverter 194 to an integrator 196 which produces an output voltage, the level of which is a function of the frequency of the input pulses applied thereto. Thus, as the frequency of the pulses fed to the integrator increases, its output voltage likewise increases. When the output voltage from integator 196 reaches a predetermined value, it will trigger multivibrators 198 and 200 to produce an output voltage pulse which is fed to the memory circuit 168. This voltage, then, will actuate the scarfing head 22 through circuit 170 in the same manner as an output voltage from the counter on lead 166.

If a negative voltage pulse in the video wave form B, such as pulse 38, is exceptionally large, it will extend below the trigger level 188 of multivibrator 186. Thus, instead of producing one output pulse for each sweep of the electron beam, the multivibrator will produce two pulses since it will be turned on and off twice during the sweep period. Consequently, the frequency of the pulses which are now fed to integrator 196 is doubled, and its output voltage is raised to the point where it will trigger multivibrators 198 and 200 to apply an output voltage to memory circuit 168. It is thus apparent that the multivibrator 200 will produce its output voltage only when an exceptionally deep, negative pulse is produced in the wave form so as to increase the frequency of the pulses fed to integrator 196.

*Operation of the system*

As long as the electron beam of vidicon 20 sweeps over defects on the surface of the slab 16, wave form N will be produced at the output of flip-flop circuit 118. This wave form will appear regardless of the speed of the slab 16 just so long as the electron beam scans a defect. For that matter, the wave form will appear even if the slab is stopped while defects are located below the vidicon scanning line. The wave form S on lead 182, however, will be produced only while the slab 16 is moving since it depends upon the frequency of the output of tachometer 28. Furthermore, the frequency of the pulses in wave form S depends upon the speed of the slab when it is moving. Thus, if the speed of the slab were doubled over that assumed for the wave forms given in FIG. 3, then two pulses would appear in wave form S, the second pulse being indicated by dotted lines in FIG. 3. It is thus apparent that if the speed of the slab 16 is doubled, the number of pulses in wave form N which are passed to gate 152 are also doubled; and, in general, it may be said the number of pulses in wave form N arriving at gate 152 is proportional to the speed of slab 16. Thus, as the slab travels through a one-foot interval, the number of pulses reaching gate 152 will be the same for a given total defect area regardless of the speed of the slab 16, the only difference being that if the speed of the slab is increased, the time interval required for the given number of pulses to arrive at gate 152 is decreased. It will also be apparent that the number of oscillations from oscillator 154 arriving at the counters 160, 162, etc. will always be the same for a given defect area regardless of the speed of the slab.

The present invention is constructed and arranged such that the scarfer control 170 will ordinarily be actuated only when the total integrated defect area over one foot of the length of the slab 16, for example, reaches a predetermined value. In this respect the counters 172, 174, etc. will provide an output pulse to reset the counters 160, 162, etc. after the slab has traveled a predetermined distance so that if an output pulse does not appear on lead 166 after the slab has traveled the predetermined length, then it will be necessary to integrate the defects appearing on the next unit of length of the slab to determine if their total area is great enough to actuate the scarfer control.

As was stated above, the wave form S is fed to the binary counters 172, 174, etc. If it is assumed that there are twelve binaries connected in series, then 4,096 pulses in wave form S will have to be fed to the binaries before an output pulse is produced on lead 182 to reset the counter. If the tachometer 28 is selected to produce 4,096 cycles of oscillation during one foot of travel of the slab 16, it will be apparent that a pulse will appear on lead 182 for each foot of travel of slab 16. Furthermore, the counters 160, 162, etc. will be reset after each foot of travel of the slab so that if a predetermined number of oscillations from oscillator 154 are not fed to the counters 160, 162, etc. during the one foot of travel, then the scarfer control 170 will not be actuated. Thus, the scarfing head operates during one-foot intervals and may or may not be actuated during any particular one-foot intervals, depending upon the number of oscillations fed to counters 160, 162 during that one-foot interval; and this number is, of course, a function of the total defect area appearing on the surface of the slab over the one foot.

Notwithstanding the above, when a negative pulse in the video wave form, such as pulse 38, extends below the triggering level of Schmitt trigger 186 due to a deep, negative defect, the frequency of the pulses fed to integrator 196 will increase. This increase will raise the output voltage of the integrator 196 to trigger multivibrators 198 and 200 and produce an output voltage which is applied to the memory device 168. Thus, where a deep, negative defect appears, the scarfing head 22 will be actuated even though the number of oscillations fed to counters 160, 162, etc. is not great enough to produce an output voltage on lead 166.

*Detailed description of circuits*

Figure 4:
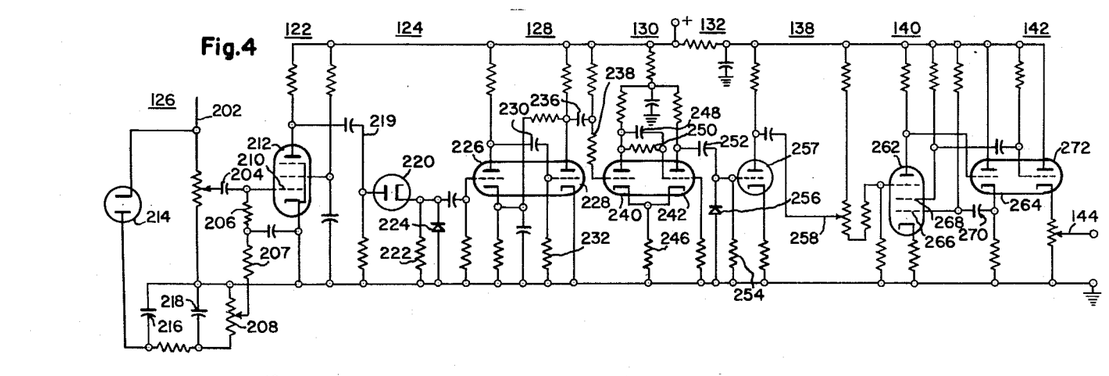
FIG. 4 is a detailed schematic diagram of the variable sweep repetition rate circuitry shown in FIG. 2.

Referring to FIG. 4, the variable sweep repetition rate circuitry identified by the number 40 in FIG. 2 comprises a lead 202 on which the sine wave output of tachometer 28 (wave form O) is applied. This sine wave is applied through capacitor 204 and a voltage divider consisting of resistors 206, 207 and 208 to the control grid 210 in the pentode 212 of variable gain amplifier 122. The automatic gain control circuit 126 comprises a diode rectifier 214 and smoothing capacitors 216, 218 which apply a direct current voltage to control grid 210, this voltage being proportional to the average voltage amplitude of the sine wave input from the tachometer. Since the amplitude of the sine wave from the tachometer will increase as its speed increases, the automatic gain control circuit, by feeding a negative voltage to grid 210, will automatically compensate for this increase to maintain the output of amplifier 122 at a substantially constant amplitude. The output of amplifier 122 on lead 219 is fed to the clipper 124 which comprises a diode 220 having its cathode connected to ground through resistor 222. In this manner, the negative half cycles of the sine wave appearing at the plate of pentode 212 are eliminated. Diode 224 in clipper 124 is a peaking diode for producing pulses that occur at the peak of the half sine wave leaving diode 220. This wave form is then applied to peaking amplifier 128 which comprises two series-connected triodes 226 and 228, with the output of triode 226 being coupled to the grid of triode 228 through an RC network consisting of capacitor 230 and resistor 232. The output of peaking amplifier 128 will appear as wave form P in FIG. 3. This wave form is applied through capacitor 236 and resistor 238 to the Schmitt trigger multivibrator 130 which comprises a pair of triodes 240 and 242 having their cathodes connected to ground through a common resistor 246. It will be noted that the anode of triode 240 is connected to the grid of triode 242 through the parallel combination of capacitor 248 and resistor 250.

Under normal conditions triode 242 will conduct while triode 240 will be cut off. When the positive pulse in wave form P is applied to the grid of triode 240, however, it will begin conduction when the pulse in wave form P reaches a predetermined amplitude. Conduction in tube 240 will cut off triode 242 because of the fall in the plate voltage of triode 240 which is coupled to the grid of triode 242 through elements 248 and 250. Triode 240 will continue to conduct until the voltage level of the pulse in wave form P falls below the aforesaid predetermined amplitude, at which time it will cut off and triode 242 will again conduct. The output appearing at the plate of triode 242 is, therefore, a series of positive square wave pulses each of which has a pulse width slightly smaller than the width of the pulse in wave form P which was fed to the grid of triode 240.

The output of the Schmitt trigger 130 on the plate of triode 242 is fed to the differentiator 132 comprising capacitor 252 and resistor 254 connected in series. As is well known to those skilled in the art, a differentiator is a circuit in which the voltage amplitude at the output is proportional at any instant to the rate of change of voltage amplitude at the input. The voltage wave form appearing at the output of the differentiator will, therefore, be a series of sharp voltage pulses which occur in time at the points where the input square wave signal changes from one voltage level to another. This wave form is shown as wave form R in FIG. 3. As the voltage changes in a positive direction, the sharp pulse produced by the differentiator is also positive, and thus the pulse 134 at the leading edge of the pulse in wave form Q is positive. As the voltage changes in a negative direction, however, the converse is true so that a negative pulse 136 is produced at the trailing edge of the wave form Q. Diode 256 clips off the negative pulse 136 so that only pulse 134 in wave form R is fed to the amplifier 138 which, in this case, comprises a single triode tube 257.

The output of the triode 257 is applied through lead 258 to the suppressor grid 260 in a pentode 262 contained in the phantastron generator 140. The phantastron 140 includes both the pentode 262 and a triode 264. It will be noted that the control and screen grids 266 and 268 of the pentode 262 are connected to the B+ voltage source. Normally, electrons will flow from the cathode of the pentode to its control and screen grids 266 and 268 rather than its anode, since these elements have a higher positive potential than the anode. When, however, the positive pulse 134 is supplied to the suppressor grid, the electrons on the cathode are accelerated toward the anode; and the grid of triode 264, which is normally conducting, is driven negative so that the triode 264 is cut off and its cathode voltage falls. This cathode voltage is applied through capacitor 270 to the control grid 262 until, over a predetermined time interval determined by the discharge rate of capacitor 270, the voltage on the control grid cuts off the pentode 262 to complete the cycle. The output voltage appearing at the screen grid 268 is a relatively long positive pulse appearing as wave form S in FIG. 3 which has its leading edge coinciding with the pulse 134 in wave form R. It will be understood, of course, that the length of the pulse in wave form S may be altered by varying the circuit constants of the phantastron. This long pulse is applied through cathode follower 142 consisting of triode 272 and lead 144 to the gating circuit 120 and binary counters 172, 174, etc.

Figure 5:
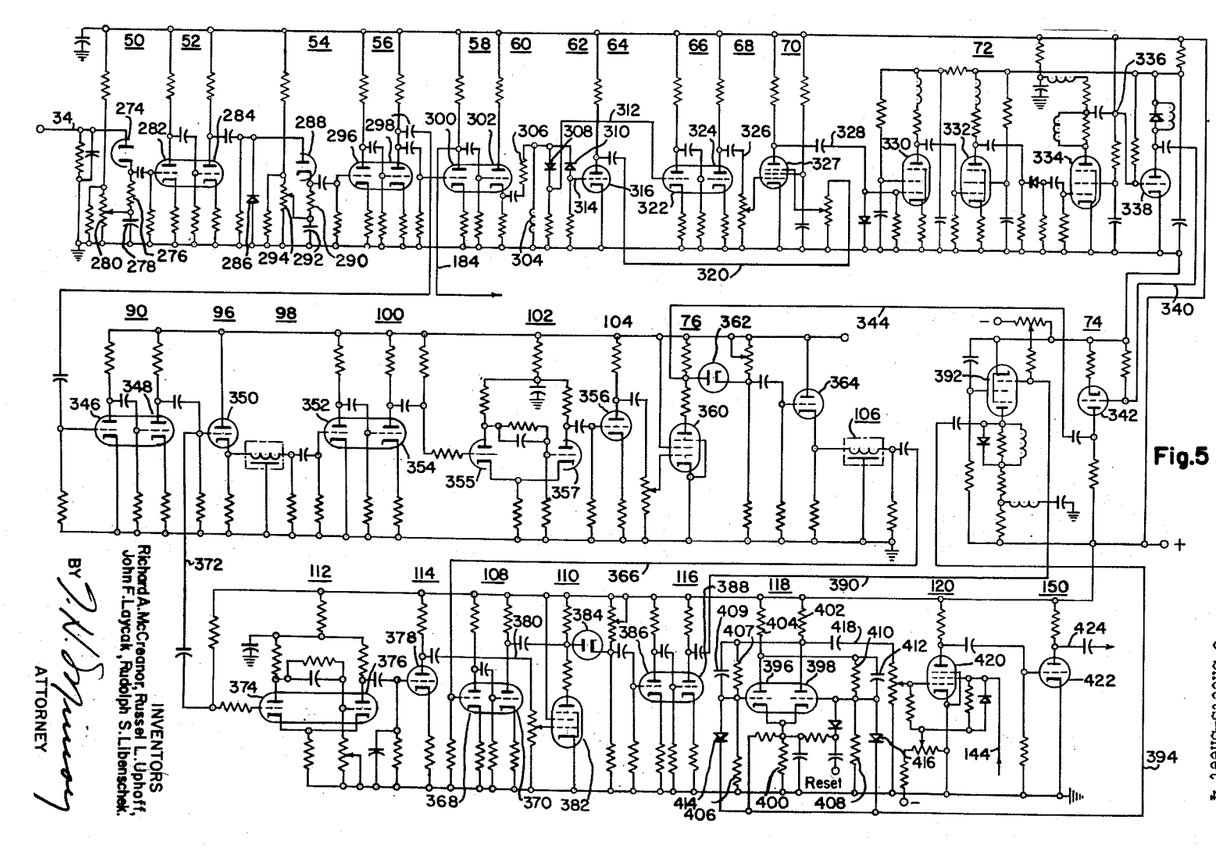
FIG. 5 is a detailed schematic diagram of the deundulating and pedestal removing circuitry shown in FIG. 2.

The deundulating and pedestal removing circuitry identified by the numeral 44 in FIG. 2 is shown in detail in FIG. 5. The video input on lead 34 appearing as wave form B in FIG. 3 is applied to the clipper 50 which consists of a diode 274 having its cathode connected to ground through resistor 276 and capacitor 278. The voltage level at the cathode of diode 274 is adjusted by a potentiometer 280 whereby the bottom portion of the wave form is removed. In actual practice the portion removed corresponds to that below the pedestal produced between the two sides of the slab 16. That is, only the portion of the wave form between points a and d remains. From clipper 50 the wave form B is passed through amplifier 52 which comprises a pair of triode tubes 282 and 284 connected in series. The output of triode 284 is clamped by diode 286 and passed to clipper 54 which comprises a diode 288 having its cathode connected to ground through resistor 290 and capacitor 292. As was the case with diode 274, the cathode potential of diode 288 is adjusted by means of voltage divider 294. The output of the clipper 54 is passed through amplifier 56 which, like amplifier 52, comprises a pair of series-connected triodes 296 and 298. The output of amplifier 56 is fed to amplifier 58 which also comprises a pair of series-connected triodes 300 and 302. In this case, the anode of triode 300 is connected through lead 184 to Schmitt trigger 186 (shown in FIGS. 2 and 8); whereas, triode 302 is connected in cathode follower relationship to the differentiator 60 comprising inductor 304 and resistor 306. The differentiator 60 operates in the same manner as differentiator 132 and thus, the output of this circuit appears as wave form D wherein a sharp voltage pulse is produced at the leading and trailing edge of each pulse in wave form C.

The pulse separator circuit 62 comprises a pair of diodes 308 and 310. It will be noted that the polarities of these diodes are reversed. Thus, diode 308 will pass positive pulses in wave form D to lead 312; whereas diode 310 will pass negative pulses in the wave form D to lead 314. The signals appearing on leads 312 and 314 are, therefore, the positive and negative halves, respectively, of wave form D. The signal on lead 314 is applied to the amplifier 64 which comprises a single triode tube 316. Since the original signal fed to the grid of triode 316 had negative pulses therein, the pulses appearing at its anode and on lead 320 will be positive. In a similar manner, positive pulses passing through diode 308, when applied to the grid of triode tube 322 in amplifier 66, will produce negative pulses at the plate of this triode which are fed to the grid of triode 324 in phase inverter 68 so that the pulses appearing at its plate are again positive. These positive pulses on lead 326 are applied to the control grid of a pentode tube 327 in the mixer 70. The output of triode 316 on lead 320 is applied to the suppressor grid of this same pentode 327, and since the pulses on leads 320 and 326 are now both positive, the output of pentode 327 will be the combined wave forms E and F.

The signal on lead 328 is then fed to a plurality of series-connected pentodes 330, 332 and 334 in amplifier 72 which produces wave form G shown in FIG. 3. The output of the last pentode 334 is applied through lead 336 to the grid of a triode 338; and the output of this triode is, in turn, fed through lead 340 to the grid of triode 342 in phase inverter 74. Thus, the output of phase inverter 74, taken from the plate of triode 342, appears on lead 344 as wave form G which has been amplified.

The video wave form on the plate of triode 298 in amplifier 56 is applied to the grid of a first pair of series-connected triodes 346 and 348 in amplifier 90. The output of amplifier 90 is passed through cathode follower 96 comprising triode 350 to the ½ microsecond delay line 98, with the output of the delay line being fed to amplifier 100. As shown, this amplifier comprises a pair of series-connected triodes 352 and 354. The anode of triode 354 in amplifier 100 is connected to the Schmitt trigger 102 which includes two triodes 355 and 357 and which operates in the same manner as the Schmitt trigger already described. The output of the Schmitt trigger 102 appearing as wave form I is fed through the phase inverter 104 comprising triode 356 to the control grid of a pentode 360 in the late gate circuit 76. Amplified wave form G on lead 344 is applied to the anode of pentode 360 which is normally conducting to apply a negative bias to the anode of diode 362. Thus, the diode will not conduct to pass signals on lead 344 as long as pentode 360 is conducting. When inverted wave form I at the output of phase inverter 104 is applied to the control grid of pentode 360 with a negative polarity, however, the pentode will be cut off, the potential at the anode of diode 362 will rise, and the diode will conduct to pass signals through triode 364 which has its cathode connected to the delay line 106. The output of the delay line, appearing as wave form K, is then applied through lead 366 to the grid of a first of a pair of series-connected triodes 368 and 370 in amplifier 108.

It will be noted that the output of amplifier 90 at the plate of triode 348 is applied through lead 372 to the grid of the first of two triodes 374 and 376 in the Schmitt trigger 112. The output of the Schmitt trigger 112, appearing as wave form L in FIG. 3, is applied through phase inverter 114 consisting of triode 378 to lead 380 where the signal, appearing as inverted wave form L in FIG. 3, is applied to the control grid of pentode 382 in early gate circuit 110. The early gate circuit operates in a manner similar to that of the late gate 76 and includes a diode 384 which has its anode connected to the anode of the pentode 382. Since the pentode is normally conducting, the voltage at the anode of diode 384 will be negative with respect to its cathode so as to cut off the diode. When, however, inverted wave form L is applied to the grid or pentode 382, the pentode will cut off and the diode 384 will conduct to pass wave form M on the plate of triode 370 in amplifier 108 to amplifier 116 which comprises series-connected triodes 386 and 388. The output of amplifier 116 on lead 390 is then fed through a pentode 392 which inverts the signal and feeds its through lead 394 to the grids of the two triodes 396 and 398 in flip-flop circuit 118.

It can be seen that the cathodes of triodes 396 and 398 are both connected to ground potential through a single resistor 400. The plate of tube 398 is connected to the B+ voltage source through resistor 402, whereas the plate of tube 396 is connected to the same source of voltage through resistor 404. The grid of tube 396 is connected to ground through resistor 406 and to the B+ voltage source through resistors 407 and 402 with resistor 407 being bypassed by capacitor 409. In a similar manner, the grid of tube 398 is connected to ground through resistor 408 and to the B+ voltage source through resistors 410 and 404, with resistor 410 being bypassed by capacitor 412. It should be noted that the plate of triode 396 is connected to the grid of tube 398 through capacitor 412 and resistor 410. Likewise, the plate of the tube 398 is connected to the grid of tube 396 through capacitor 409 and resistor 407.

When a source of anode voltage is applied to the flip-flop circuit, current will tend to flow in the plate circuits of triodes 396 and 398. If the two halves of the circuit are identical, the tube currents will be nearly equal at first. However, a perfect balance is always impossible; and as will become apparent from the following description, means are provided to insure that one of the tubes initially conducts more heavily than the other. This initial difference in conduction brings about a cumulative increase in the end balance as follows: It will be assumed that triode 396 initially conducts more heavily than triode 398. The increased current in triode 396 causes an increase in the voltage drop across resistor 404 and, thus, a decrease in the plate voltage of tube 396. Because of the connection between the plate of triode 396 and the grid of triode 398, the decrease in the plate voltage of triode 396 is accompanied by a decrease in the grid voltage of triode 398. Therefore, an increase in the plate current of tube 396 must be accompanied by a decrease in the plate current of tube 398 since its grid is now driven negatively. Moreover, the decrease of plate current through tube 398 causes an increase of the grid voltage of triode 396, and consequently, results in a further increase of plate current through triode 396.

In this manner, a slight initial unbalance sets up a cumulative or regenerative switching action which reduces the plate current of tube 398 to zero and increases the plate current of tube 396 to a maximum. Though described as if it occurred slowly, this switching action occurs with extreme rapidity—in a fraction of a microsecond in most flip-flop circuits.

The pulses 82, 84, 86 and 88 in wave form M on lead 394 are applied to the grids of triodes 396 and 398 through diodes 414 and 416. If triode 396 is conducting, these pulses which are negative on the plate of pentode 392 and lead 394, cut off the triode 396. This causes a regenerative switching action in which, while triode 396 cuts off, triode 398 conducts. Furthermore, triode 398 will continue to conduct until the next pulse is received which is pulse 84 in wave form M. This pulse will now cut off tube 398 and will again initiate conduction in triode 396. The result is that a pulse between the spiked pulses 82 and 84 in wave form M is produced on lead 418 as wave form N (inverted) in FIG. 3. This wave form is fed to the control grid of pentode 420 in gating circuit 120. Fed to the screen grid of pentode 420 is wave form S on lead 144. Thus, when there is coincidence between a pulse on lead 144 with pulses on lead 418, the shorter pulses on lead 418 will be passed to phase inverter 150 which comprises a triode 422. The output of this triode on lead 424 is then fed as wave form T to gating circuit 152 shown in FIG. 2 which is part of the defect integrator hereinafter described.

Figure 6:
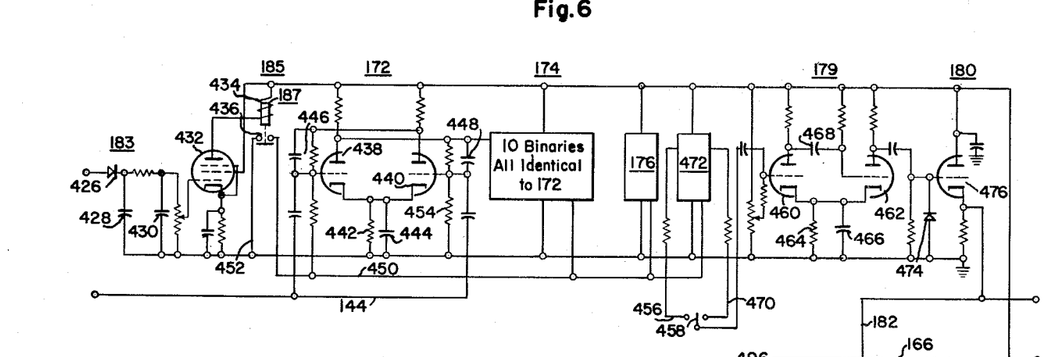
FIG. 6 is a detailed schematic diagram of the displacement detector circuitry shown in FIG. 2.

Referring to FIG. 6, the displacement detector circuitry identified by the numeral 42 in FIG. 2 comprises the rectifier 183 which includes a diode 426 and a pair of smoothing capacitors 428 and 430. The output of the rectifier 183, which is a direct current voltage, is fed to the control grid of a pentode vacuum tube 432 in the reset generator 185. The plate circuit of pentode 432 includes the energizing coil 434 of the relay 187 which is normally deenergized whereby its contacts 436 are open. When, however, the tachometer 28 is rotating, and an alternating current voltage applied to the rectifier 183, the resulting direct current voltage on the grid of pentode 432 energizes coil 434 to close contacts 436.

Also included in the displacement detector are thirteen cascade-connected binary counters or flip-flop circuits 172, 174, etc., which are similar in construction to the flip-flop circuit already described. Each binary comprises a pair of triodes 438 and 440 having their cathodes connected through a common resistor 442 and capacitor 444 to ground. The grid of triode 438 is connected through capacitor 446 to the plate of triode 440; and similarly, the grid of triode 440 is connected through capacitor 448 to the plate of triode 438. In this manner, only one of the two triodes will conduct while the other triode is cut off. Reverting again to relay 187, it will be seen that when its contacts 436 are closed, the grid of the left-hand triode in each of the thirteen binaries, namely, the grid of triode 438 in binary 172, is connected to ground through leads 450 and 452. The grid of the right-hand tube in each binary, namely, the grid of triode 440 in binary 172, is always connected to ground through resistor 454 so that triode 440 will normally conduct. The output of cathode follower 142 on lead 144, namely, wave form S of FIG. 3, is simultaneously applied to the grids of triodes 438 and 440 in the binary 172, while the output of this binary is simultaneously applied to the grids of the triodes in the next binary and so on to produce a cascade arrangement. The pulses in wave form S as applied to the binary 172 have positive polarities; and, thus, if it is assumed that triode 440 in binary 172 is conducting, the pulse on lead 144, having a positive polarity, will initiate conduction in triode 438 while cutting off triode 440. Triode 438, however, will be cut off and triode 440 will conduct when the next successive pulse in wave form S is received on lead 144.

Thus, a single negative pulse will be produced at the plate of triode 438 and passed to the second binary in the system for each two input pulses on lead 144. In order for a second pulse to appear at the plate of triode 438, another two pulses will have to be applied via lead 144. Thus, before the second binary will produce an output pulse, four pulses must appear on lead 144, and similarly, before the third binary will produce an output pulse, eight input pulses must appear on lead 144. In order for the twelfth binary to produce an output pulse, 4,096 pulses must have been applied to the original binary 172 from lead 144. The output pulse from the twelfth binary may be applied through lead 456 and switch 458 to the control grid of a triode tube 460 in the one-shot multivibrator 178.

The one-shot multivibrator 178 is somewhat similar to the binary flip-flop stages just described except that it does not shift from one stable state to another, but rather has only one stable state which may be interrupted by an input pulse to produce an output pulse of fixed pulse width. Thus, the multivibrator 178 includes the two triodes 460 and 462 each of which has its cathode connected to ground through a common resistor 464 and capacitor 466. In this case, however, the plate of triode 460 only is connected to the grid of triode 462 through capacitor 468. Under normal conditions tube 460 will conduct while tube 462 is cut off. When, however, an output pulse from the twelfth binary stage 176 is applied to the grid of triode 460, the triode will cut off and its plate voltage will rise. This plate voltage will be applied through capacitor 468 to the grid of triode 462, causing this latter triode to conduct. After a predetermined period of time the charge on capacitor 468 will leak off, whereupon the triode 462 will cut off, and since the pulse on the grid of triode 460 persists for a relatively short time, it will again conduct until the next successive pulse is applied to its grid. If switch 458 is reversed so that the grid of triode 460 is connected to lead 470, rather than lead 456, then an additional thirteenth binary 472 will have been inserted into the circuit, which means that twice the number of pulses on lead 144 will have to be counted before an output pulse is supplied to the grid of triode 460. If the number of pulses counted by the first twelve binary circuits represents one foot of travel of the slab 16, for example, then the number of pulses counted when the binary 472 is inserted into the system represents two feet of travel.

The output of the one-shot multivibrator 178 appearing on the plate of triode 462 is applied via clamping diode 474 to the grid of a triode tube 476 in the cathode follower stage 180. The output of this cathode follower on lead 182 is a pulse which occurs once during each counting period of the displacement detector 42. That is, if switch 458 is connected to lead 456 so that the binaries count 4,096 pulses in wave form S, then a pulse will be produced on lead 182 for each 4,096 pulses in the wave form S. Similarly, if switch 458 is connected to lead 470, then twice the number of counts or 8,192 pulses will have to be fed to the displacement detector 42 on lead 144 before an output pulse is produced on lead 182. This output pulse is used to reset a plurality of decade counting units in the defect integrator, hereinafter described.

Figure 7:
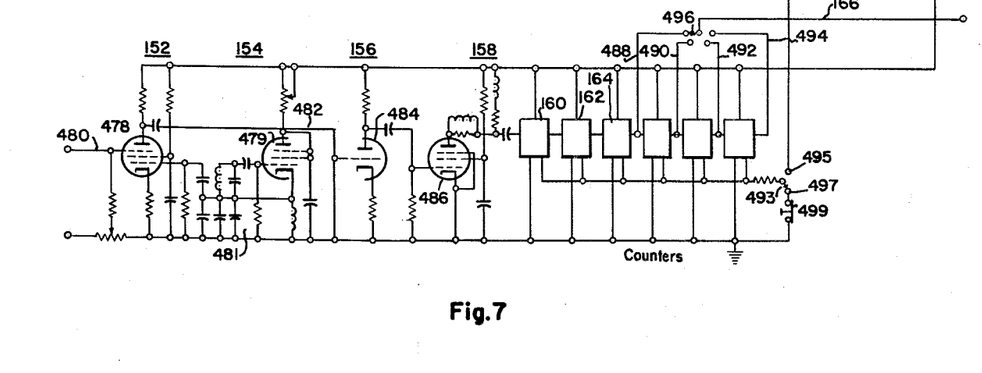
FIG. 7 is a detailed schematic diagram of the defect integrating circuitry shown in FIG. 2.

Referring to FIG. 7, the defect integrator, identified by the number 46 in FIG. 2, comprises the gating circuit 152 which includes a pentode vacuum tube 478 having the output of phase inverter 150 applied to its suppressor grid via lead 480. This output appears as wave form T in FIG. 3 and comprises a train of short pulses indicating the existence of a defect. These pulses, however, occur only during coincidence of a pulse in wave form S with pulses in wave form N as was explained above. It will be noted that each pulse 146 and 148 in wave form T has a pulse width corresponding to the width of the defect which it represents. The pentode tube 478 is essentially a mixer having the output of the one megacycle oscillator 154 applied to its control grid. As shown, the oscillator includes a pentode 479 and a tank circuit 481. Thus, the wave form appearing at the plate of pentode 478 will be wave form U shown in FIG. 3 which comprises short bursts of oscillation from oscillator 154, these short bursts of oscillation extending for the pulse duration of each pulse in wave form T.

The output of the gating circuit 152 is applied via lead 482 to the control grid of a triode 484 in the phase inverter 156. The output of triode 484 appearing on its plate is then applied to the control grid of a pentode 486 in peaking amplifier 158. The output of this amplifier is then fed to the series of decade counters 160, 162, etc. which produce an output pulse on leads 488, 490, 492 and 494 only after a predetermined number of oscillations are supplied to the counter from peaking amplifier 158. Obviously, the number of pulses required to produce an output pulse on lead 488 is less than that required to produce an output pulse on lead 490. Similarly, the number of oscillations required to produce an output pulse on lead 492 is greater than that required to produce an output pulse on lead 490. By means of switch 496, any one of the respective leads 488—494 may be connected to lead 166 which leads to the memory circuit 168 and scarfer control 170 shown in FIG. 2. Thus, the scarfing head 22 may be made to operate in response to an output pulse on lead 166 for various numbers of oscillations from oscillator 154. Since the number of oscillations is a direct function of the total defect area along a predetermined length of the slab, the defect area required to actuate the scarfing head may likewise be varied by changing the position of switch 496.

It will be remembered that a pulse was produced on lead 182 by the defect integrator shown in FIG. 6 only after the slab had moved a predetermined distance along conveyor 18. Thus, every time a pulse is applied to lead 182 to reset the counters 160, 162, etc., the slab will have moved a predetermined distance. If the total number of oscillations from oscillator 154 representing the total defect area over the aforesaid interval of length do not reach the number required to produce an output pulse on lead 166, then the scarfer head 22 is not actuated, and the length of the billet represented by the distance between pulses on lead 182 is not scarfed. If it is desired to manually reset the decade units 160, 162, etc., switch 493 will be transferred from contact 495 to contact 497 whereby the push-button switch 499 may be depressed to reset the circuitry.

Referring to FIG. 8, the override circuitry for deep, negative defects represented by the numeral 48 in FIG. 2 comprises the Schmitt trigger 186 which includes triodes 498 and 500. This circuit operates in the same manner as the previous Schmitt trigger described. That is, it will produce an output square wave pulse having a pulse width corresponding to the time duration of that portion of an input signal above a predetermined triggering level. The wave form C shown in FIG. 3 is applied to the grid of triode 498, and the threshold value of this tube is adjusted by potentiometer 502 to the position indicated by the line 188 in FIG. 3. Thus, the Schmitt trigger 186 will produce an output pulse for each pulse extending between points a and d in the wave form C, assuming that the pulse 38 due to a negative defect does not extend below the threshold voltage level represented by line 188. If the pulse does extend below this threshold level, then the circuit 186 will be triggered twice during the period of each pulse between points a and d, and the frequency of the pulses at the output of circuit 186 will be effectively doubled.

The output of Schmitt trigger 186 on the plate of triode 500 is passed to one-shot multivibrator 190 which includes a pair of triodes 504 and 506 and which operates in the manner previously described. Consequently, the multivibrator 190 will produce an output pulse of fixed pulse width for each input pulse applied thereto from the Schmitt trigger 186. Coupled to multivibrator 190 is the amplifier 192 which comprises a pentode 508 having the input signal applied to its control grid. The output of pentode 508 is then applied to the grid of triode 510 in phase inverter 194. It should be noted here that a signal is taken on leads 512 and 514 from both the plate and cathode of the triode 510 in phase inverter 194. The respective pulses on these leads are then applied to the grids of triodes 515 and 516 in integrator 196. With no input pulses applied to either triode 515 or 516, the triode 516 will be normally conducting while triode 515 will normally be cut off. Consequently, capacitor 518 will be charged through the triode 516. When a pulse from the amplifier 192 is applied to the triode 510 in phase inverter 194, a positive pulse will appear on lead 512, while a negative pulse will appear on lead 514. Consequently, triode 516 is cut off while triode 515 is rendered conducting to effectively short circuit the capacitor 518. Element 520 serves as a smoothing capacitor in the integrator.

If a deep, negative defect pulse 38 does not appear in the original video wave form C, the frequency with which the capacitor 518 periodically discharges will not be enough to raise the voltage on the grid of triode 524 in Schmitt trigger 198 above its firing value. If, however, the frequency of the input pulses is doubled due to the presence of a deep, negative defect represented by the pulse 38, then the Schmitt trigger 198 will be actuated whereby the triode 526 will produce a voltage to trigger multivibrator 200 which includes two triode tubes 528 and 530. The output of multivibrator 200 on lead 532 is then applied to the memory circuit 168 and scarfing control circuit 170 to actuate the scarfing head 22 when the deep, negative defect appears in the video wave form C regardless of whether the number of oscillations counted in defect integrator 46 are great enough to normally produce an output voltage on lead 166.

Although the invention has been shown in connection with a certain specific embodiment, it will be readily apparent to those skilled in the art that various changes in form and arrangement of parts may be made to suit requirements without departing from the spirit and scope of the invention. In this respect the entire circuitry shown in FIGS. 4–8 could be transistorized to replace the vacuum tubes shown herein.

We claim as our invention:

1. In apparatus for detecting flaws on the surface of moving material in which the flaws have a different optical appearance than the remainder of the material, the combination of means including an electron-optics device for scanning an image of the surface of said material with an electron beam along a line extending perpendicular to the direction of movement of the material to produce a pulsed signal in which each pulse has a width proportional to the width of a flaw along said line, means responsive to the speed of said moving material for eliminating a portion of the pulses in said pulsed signal to produce a resultant signal, the portion of the pulses eliminated being a function of the speed of said material, and means for integrating the widths of the pulses in said resultant signal to produce an indicating voltage when the sum of said widths reaches a predetermined amount.

2. In apparatus for detecting flaws on the surface of irradiant material in which the flaws have a different light intensity than the remainder of the material, the combination of means including an electron-optics device for periodically scanning an image of the surface of the irradiant material with an electron beam to produce a pulsed signal in which positive and negative pulses are produced when the electron beam scans the images of flaws having greater and lesser light intensities respectively than the remainder of the material, the widths of the pulses in said signal being proportional to the widths of the flaw images scanned by said electron beam, a source of oscillatory voltage, counting means for producing an indicating voltage in response to a predetermined number of oscillations from the oscillatory voltage source, and means responsive to at least some of the pulses in said signal for coupling the output of said oscillatory voltage source to said counting means for successive time intervals which are proportional to the widths of the pulses applied thereto, whereby the said indicating voltage will be produced when the sum of the widths of the said applied pulses reaches a predetermined amount.

3. The combination claimed in claim 2 and including means responsive to said pulsed signal for producing an indicating voltage when the amplitude of negative pulses in said pulsed signal reaches a predetermined limit.

4. In apparatus for integrating the areas of flaws over a predetermined area of the surface of moving material in which the flaws have a different light intensity than the remainder of the material, the combination of means including an electron-optics device for periodically scanning an image of the irradiant material along a line extending substantially perpendicular to the direction of movement of the material to produce a first pulsed signal in which each pulse has a width proportional to the width of a flaw along said scanning line, means responsive to the speed of said moving material for producing a second pulsed signal in which successive pulses all have the same pulse width, the pulse recurrence frequency of pulses in said second signal being proportional to the speed of said material, a coincidence stage for gating said first signal with the second signal to produce output pulses only upon coincidence of pulses in said first signal with pulses in the second signal, a source of oscillatory voltage, means for producing a control voltage in response to a predetermined number of oscillations from the oscillatory voltage source, and means responsive to said output pulses for coupling oscillations from said oscillatory voltage source to said counting means for successive time intervals which are proportional to the widths of the successive output pulses.

5. In an automatic hot scarfing machine for burning flaws from the surface of heated steel slabs, the combination of conveyor means for moving the heated slab along a substantially straight line path, an electron-optics device mounted above said path for scanning an image of the surface of a heated slab passing therebeneath along a line extending substantially perpendicular to the direction of movement of the slab to thereby produce a pulsed signal in which each pulse has a width proportional to the width of a flaw image along said scanning line, means for integrating the widths of the pulses in said signal to produce a control voltage when the sum of the widths in said signal reaches a predetermined amount, and means operable in response to said control voltage for rendering said scarfing machine operative.

6. In an automatic hot scarfing machine for burning defects from the surface of heated steel slabs, the combination of conveyor means for moving the heated slab along a substantially straight line path, an electron-optics device mounted above said path for scanning an image of the surface of a heated slab passing therebeneath along a line extending substantially perpendicular to the direction of movement of the slab to thereby produce a pulsed signal in which each pulse has a width proportional to the width of a flaw image along said scanning line, means responsive to the speed of said slab for gating said pulsed signal to eliminate a portion of the pulses therein and produce a resultant pulsed signal, the portion of the pulses eliminated being a function of the speed of said slab, means for integrating the widths of the pulses in said resultant signal to produce a control voltage when the sum of the widths in said resultant signal reaches a predetermined amount, and means operable in response to said control voltage for rendering said scarfing machine operative.

7. In an automatic hot scarfing machine for burning defects from the surface of heated steel slabs, the combination of conveyor means for moving the heated slab along a substantially straight line path, an electron-optics device mounted above said path for scanning an image of the surface of a heated slab passing therebeneath along a line extending substantially perpendicular to the direction of movement of the slab to thereby produce a pulsed signal in which positive pulses are produced by defect images having a greater light intensity than the remainder of the slab and negative pulses are produced by defect images having a lesser light intensity than the remainder of the slab, the widths of said positive and negative pulses being proportional to the widths of the defects which they represent, means coupled to said electron-optics device for integrating the widths of a portion of the positive and negative defect pulses in said signal to produce a first control voltage when the sum of the widths of said portion of the positive and negative defect pulses reaches a predetermined amount, means responsive to said pulsed signal for producing a second control voltage when the amplitude of negative defect pulses in said pulsed signal reaches a predetermined limit, and means responsive to both said first and second control voltages for rendering said scarfing machine operative whenever a control voltage is applied thereto.

8. In apparatus for automatically controlling a device for scarfing the surface of a moving irradiant metal body on which flaws appear brighter or darker with respect to the remainder of the body, the combination of an electron-optics device for scanning an image of the surface of said body with an electron beam to thereby produce a video signal in which each scanning cycle of the electron beam produces a relatively long pulse of one polarity having superimposed thereon short pulses produced when the electron beam scans over a flaw image, a differentiator responsive to said video signal for producing a spiked positive pulse at one edge of each pulse in said video signal and a spiked negative pulse at the other edge of each pulse in the video signal, means for converting all of said spiked pulses to one polarity, apparatus responsive to said video signal for producing first and second pulsed signals in which the pulses have the same pulse width and recurrence frequency as said relatively long pulses in the video signal, means for delaying the first pulsed signal by a predetermined amount, first means for gating said spiked pulses with the delayed first pulsed signal whereby the spiked pulse due to the leading edge of the relatively long pulse in said video signal is eliminated, means for delaying the spiked pulses after passing through said first gating means, second means for gating the delayed spiked pulses with said second pulsed signal whereby the spiked pulse due to the trailing edge of the relatively long pulse in said video signal is eliminated, a device responsive to said spiked pulses for producing a third pulsed signal in which a pulse is formed between each pair of spikes formed by the leading and trailing edges of each short pulse in the original video wave form, means for eliminating a number of pulses in said third pulsed signal which is proportional to the speed of said body, a source of oscillatory voltage, counting means for producing a control voltage in response to a predetermined number of oscillations from said oscillatory voltage source, means responsive to said third signal after pulses are eliminated therefrom for coupling the output of said oscillatory voltage source to said counting means for successive time intervals which are proportional to the widths of the successive pulses in said third signal, and apparatus responsive to the control voltage from said counting means for actuating said scarfing device to remove a predetermined length of the surface of said body.

9. In apparatus for automatically controlling a device for scarfing the surface of a moving irradiant metal body on which flaws appear brighter or darker with respect to the remainder of the body, the combination of an electron-optics device for scanning an image of the surface of said body with an electron beam to thereby produce a video signal in which each scanning cycle of the electron beam produces a relatively long pulse of one polarity having superimposed thereon short pulses produced when the electron beam scans over a flaw image, means responsive to said video signal for producing at the leading and trailing edges of each pulse in the video signal, apparatus responsive to said video signal for producing first and second pulsed signals in which the pulses have the same pulse width and recurrence frequency as said relatively long pulses in the video signal, means for delaying the first pulsed signal, means for gating said spiked pulses with the delayed first pulsed signal whereby the spiked pulse due to the leading edge of the relatively long pulse produced by said electron beam is eliminated, means for delaying the spiked pulses after passing through said first gating means, second means for gating the delayed spiked pulses with said second pulsed signal whereby the spiked pulse due to the trailing edge of the relatively long pulse produced by said electron beam is eliminated, a device responsive to said spiked pulses for producing a third pulsed signal in which a pulse is formed between each pair of spikes formed by the leading and trailing edges of each short pulse in the original video wave form, means for eliminating a predetermined number of pulses in said third pulsed signal which is proportional to the speed of said body, a source of oscillatory voltage, counting means for producing a control voltage in response to a predetermined number of oscillations from said oscillatory voltage source, means responsive to said third signal after pulses are eliminated therefrom for coupling the output of said oscillatory voltage source to said counting means for successive time intervals which are proportional to the widths of the successive pulses in said third signal, and apparatus responsive to the control voltage from said counting means for actuating said scarfing device to remove a predetermined length of the surface of said body.

10. In apparatus for automatically controlling a device for scarfing the surface of a moving irradiant metal body on which flaws appear brighter or darker with respect to the remainder of the body, the combination of an electron-optics device for scanning an image of the surface of said body with an electron beam to thereby produce a video signal in which each scanning cycle of the electron beam produces a relatively long pulse of one polarity having superimposed thereon short pulses produced when the electron beam scans over a flaw image, means responsive to said video signal for producing a differentiated signal in which spiked pulses are produced at the leading and trailing edges of each pulse in the video signal, apparatus responsive to said video signal for producing first and second pulsed signals in which the pulses have the same pulse width and recurrence frequency as said relatively long pulses produced by the electron beam, means for delaying the first pulsed signal, first means for gating said spiked pulses with the delayed first pulsed signal whereby the spiked pulse due to the leading edge of the relatively long pulse produced by said electron beam is eliminated, means for delaying the spiked pulses after passing through said first gating means, second means for gating the delayed spiked pulses with said second pulsed signal whereby the spiked pulse due to the trailing edge of the relatively long pulse produced by said electron beam is eliminated, a device responsive to said spiked pulses for producing a third pulsed signal in which a pulse is formed between the spikes formed by the leading and trailing edges of at least some of the short pulses in the original video wave form, a source of oscillatory voltage, counting means for producing a control voltage in response to a predetermined number of oscillations from said oscillatory voltage source, means responsive to said third signal for coupling the output of said oscillatory voltage source to said counting means for successive time intervals which are proportional to the widths of the successive pulses in said third signal, and apparatus responsive to the control voltage from said counting means for actuating said scarfing device to remove a predetermined length of the surface of said body.

11. In apparatus for automatically controlling a device for scarfing the surface of a moving irradiant metal body on which flaws appear brighter or darker with respect to the remainder of the body, the combination of an electron-optics device for scanning an image of the surface of said body with an electron beam along a straight line extending perpendicular to the direction of movement of the body to thereby produce a video signal in which each scanning cycle of the electron beam produces a relatively long pulse of one polarity having superimposed thereon short pulses produced when the electron beam scans over a flaw image, the brighter flaws producing positive short pulses while the darker flaws produce short negative pulses, means for clipping the lower portion of each long pulse, a differentiator coupled to the output of said clipping means for producing a spiked positive pulse at one edge of each pulse in said signal and a spiked negative pulse at the other edge of each pulse in the signal, means for converting all of said spiked pulses to one polarity, apparatus responsive to said video signal for producing first and second pulsed signals in which the pulses have the same pulse width and recurrence frequency as said relatively long pulses produced by the electron beam, means for delaying the first pulsed signal, first means for gating said spiked pulses with the delayed first pulsed signal whereby the spiked pulse due to the leading edge of the relatively long pulse produced by said electron beam is eliminated, means for delaying the spiked pulses after passing through said first gating means, second means for gating the delayed spiked pulses with said second pulsed signal whereby the spiked pulse due to the trailing edge of the relatively long pulse produced by said electron beam is eliminated, a device responsive to said spiked pulses for producing a third pulsed signal in which a pulse is formed between each pair of spikes formed by the leading and trailing edges of each short pulse in the original video wave form produced by said electron beam, gating means for eliminating a number of pulses in said third pulsed signal which is proportional to the speed of said body, a source of oscillatory voltage, counting means for producing a control voltage in response to a predeterminded number of oscillations from said oscillatory voltage source, means responsive to said third signal after pulses are eliminated therefrom for coupling the output of said oscillatory voltage source to said counting means for successive time intervals which are proportional to the widths of the successive pulses in said third signal, and apparatus responsive to the control voltage from said counting means for actuating said scarfing device to remove a predetermined length of the surface of said body.

12. In apparatus for automatically controlling a device for scarfing the surface of a moving irradiant metal body on which flaws appear brighter or darker with respect to the remainder of the body, the combination of an electron-optics device for scanning an image of the surface of said body with an electron beam to produce a video signal in which each scanning cycle of the electron beam produces a relatively long pulse having superimposed thereon positive and negative short pulses produced when the electron beam scans over flaw images, means responsive to said video signal for producing a differentiated signal in which spiked pulses are produced at the leading and trailing edges of each pulse in the video signal, means for eliminating the spiked pulses in said differentiated signal which are due to the leading and trailing edges of the relatively long pulses in said video signal, a device responsive to the output of said last-named means for producing a third pulsed signal in which a pulse is formed between each pair of spikes formed by the leading and trailing edges of each short pulse in the original video wave form, means for eliminating a number of pulses in said third pulsed signal which is proportional to the speed of said body, a source of oscillatory voltage, counting means for producing a control voltage in response to a predetermined number of oscillations from said oscillatory voltage source, means responsive to said third signal after pulses are eliminated therefrom for coupling the output of said oscillatory voltage source to said counting means for successive time intervals which are proportional to the widths of the successive pulses in said third signal, and apparatus responsive to the control voltage from said counting means for actuating said scarfing device to remove a predetermined length of the surface of said body.

13. The combination claimed in claim 12 and including means for producing a second output voltage for actuating the scarfing device when the amplitude of negative short pulses in said video signal reaches a predetermined limit.

14. The combination claimed in claim 12 wherein the means for eliminating a number of pulses in the third pulsed signal which is proportional to the speed of said body comprises a device for producing a train of square waves each of which has a fixed pulse width and a pulse recurrence frequency proportional to the speed of said body, and means for gating said third pulsed signal with said train of square waves whereby the gating means will pass the third pulsed signal only during the occurrence of a square wave in said train of square waves.

15. The combination claimed in claim 12 wherein the means for eliminating a number of pulses in the third pulsed signal which is proportional to the speed of said body comprises a device for producing a sine wave signal having a frequency proportional to the speed of said body, means for producing a square wave pulse for every other half cycle of the sine wave signal, means responsive to the square wave pulses for producing a train of square waves each of which has a fixed pulse width and a pulse recurrence frequency proportional to the frequency of the sine wave, and means for gating said third pulsed signal with said train of square waves whereby the gating means will pass the third pulsed signal only during the occurrence of a square wave in said train of square waves.

16. The combination claimed in claim 12 wherein the means for eliminating a number of pulses in the third pulsed signal comprises a device for producing a train of square waves each of which has a fixed pulse width and a pulse recurrence frequency proportional to the speed of said body, means for gating said third pulsed signal with said train of square waves whereby the gating means will pass the third pulsed signal only during the occurrence of a square wave in said train of square waves, a plurality of series-connected binary counting devices responsive to said train of square waves for producing a second control voltage when the sum of the square waves reaches a predetermined amount, and apparatus responsive to said second control voltage for resetting said means for counting the output of said oscillatory voltage source whereby the counting means will count said predetermined number of oscillations after being reset before it produces its said control voltage.

17. In apparatus for detecting flaws on the surface of moving material in which the flaws have a different optical appearance than the remainder of the material, the combination of means including an electron-optics device for scanning an image of the surface of said material with an electron beam to produce a pulsed signal in which each pulse has a width proportional to the width of a flaw image scanned by said electron beam, and means coupled to said first-named means for integrating the widths of a portion of the pulses in said signal to produce an indicating voltage when the sum of the widths of said portion of the pulses reaches a predetermined amount.

18. In apparatus for integrating the areas of flaws on the surface of moving material in which the flaws have a different optical appearance than the remainder of the material, the combination of means including an electron-optics device for scanning an image of the material with an electron beam at a constant scanning frequency to produce a first pulsed signal in which each pulse has a width proportional to the width of a flaw image scanned by said electron beam, means responsive to the speed of said moving material for producing a second pulsed signal in which the pulse recurrence frequency is proportional to the speed of said material, a coincidence stage for gating said first signal with the second signal to produce output pulses only upon coincidence of pulses in said first signal with pulses in the second signal, a source of oscillatory voltage, counting means for producing a control voltage in response to a predetermined number of oscillations from the oscillatory voltage source, and means responsive to said output pulses for coupling oscillations from said oscillatory voltage source to said counting means for successive time intervals which are proportional to the widths of the successive output pulses.

19. In apparatus for detecting flaws on the surface of material in which the flaws appear brighter or darker with respect to the remainder of the material, the combination of an electron-optics device mounted above said material for scanning an image of the surface of the material to produce a pulsed video signal in which positive pulses are produced by defect images having a greater light intensity than the remainder of the material and negative pulses are produced by defect images having a lesser light intensity than the remainder of the material, the widths of said positive and negative pulses being proportional to the widths of the defects they represent, means coupled to said electron-optics device for integrating the widths of at least a portion of the positive and negative defect pulses in said video signal to produce a first control voltage when the sum of the widths of said portion of the positive and negative defect pulses reaches a predetermined amount, and means responsive to said pulsed signal for producing a second control voltage when the amplitude of any negative defect pulse in said pulsed video signal exceeds a predetermined limit.

20. In apparatus for detecting flaws on the surface of material in which flaws appear brighter or darker with respect to the remainder of the material, the combination of an electron-optics device for scanning an image of the surface of said material with an electron beam to thereby produce a video signal in which each scanning cycle of the electron beam produces a relatively long pulse of one polarity having superimposed thereon short pulses produced when the electron beam scans over a flaw image, a differentiator responsive to said video signal for producing a spiked positive pulse at one edge of each pulse in said video signal and a spiked negative pulse at the other edge of each pulse in said video signal, means for converting all of said spiked pulses to one polarity, apparatus responsive to said video signal for producing first and second pulsed signals in which the pulses have the same pulse width and recurrence frequency as said relatively long pulses in said video signal, means for delaying the first pulsed signal by a predetermined amount, first means for gating said spiked pulses with the delayed first pulsed signal whereby the spiked pulse due to the leading edge of the relatively long pulse in said video signal is eliminated, means for delaying the spiked pulses after passing through said first gating means, second means for gating the delayed spiked pulses with said second pulsed signal whereby the spiked pulse due to the trailing edge of the relatively long pulse in said video signal is eliminated, a device responsive to said spiked pulses for producing a third pulsed signal in which a pulse is formed between each pair of spikes formed by the leading and trailing edges of each short pulse in the original video waveform, means for eliminating a number of pulses in said third pulsed signal which is proportional to the speed of said body, a source of oscillatory voltage, counting means for producing a control voltage in response to a predetermined number of oscillations from said oscillatory voltage source, and means responsive to said third signal after pulses are eliminated therefrom for coupling the output of said oscillatory voltage source to said counting means for successive time intervals which are proportional to the widths of the successive pulses in said third signal.

21. In apparatus for detecting flaws on the surface of material in which the flaws appear brighter or darker with respect to the remainder of the material, the combination of an electron-optics device for scanning an image of the surface of said body with an electron beam to thereby produce a video signal in which each scanning cycle of the electron beam produces a relatively long pulse of one polarity having superimposed thereon short pulses produced when the electron beam scans over a flaw image, a differentiator responsive to said video signal for producing a spiked positive pulse at one edge of each pulse in said video signal and a spiked negative pulse at the other edge of each pulse in the video signal, means for converting all of said spiked pulses to one polarity, means responsive to said spiked pulses for producing a pulsed signal in which a pulse is formed between each pair of spikes formed by the leading and trailing edges of each short pulse in the original video waveform, means for eliminating a number of pulses in said latter-mentioned pulsed signal which is proportional to the speed of said body, and means for integrating the widths of the remaining pulses in said latter-mentioned pulsed signal to produce a control voltage when the sum of the integrated widths reaches a predetermined magnitude.

22. In apparatus for detecting flaws on the surface of material in which the flaws appear brighter or darker with respect to the remainder of the material, the combination of an electron-optics device for scanning an image of the surface of said material with an electron beam to produce a video signal in which each scanning cycle of the electron beam produces a relatively long pulse of one polarity having superimposed thereon short pulses produced when the electron beam scans over a flaw image, the brighter flaws producing positive short pulses while the darker flaws produce short negative pulses, a differentiator responsive to said video signal for producing a spiked positive pulse at one edge of each pulse in said video signal and a spiked negative pulse at the other edge of each pulse in the signal, means for converting all of said spiked pulses to one polarity, means responsive to said converted spiked pulses for producing a pulsed signal in which a pulse is formed between each pair of spikes formed by the leading and trailing edges of each short pulse in the original video waveform, means for eliminating a number of pulses in said latter-mentioned pulsed signal which is proportional to the speed of said body, a source of oscillatory voltage, counting means for producing a control voltage in response to a predetermined number of oscillations from said oscillatory voltage source, and means responsive to said latter-mentioned pulsed signal after pulses are eliminated therefrom for coupling the output of said oscillatory voltage source to said counting means for successive time intervals which are proportional to the widths of the successive pulses in said latter-mentioned pulsed signal.

23. The combination claimed in claim 22 and including apparatus responsive to said video signal for producing a control voltage whenever a short negative pulse in the video signal produced by a darker flaw exceeds a predetermined amplitude.

(References on following page)

References Cited in the file of this patent

UNITED STATES PATENTS

| | | |
|---|---|---|
| 2,186,096 | Bucknam | Jan. 9, 1940 |
| 2,436,503 | Cleveland | Feb. 23, 1948 |
| 2,438,098 | Tandler et al. | Mar. 16, 1948 |
| 2,479,624 | Jones | Aug. 23, 1949 |
| 2,570,405 | Tandler et al. | Oct. 9, 1951 |
| 2,672,392 | Coples et al. | Mar. 16, 1954 |
| 2,674,915 | Anderson | Apr. 13, 1954 |
| 2,684,464 | Hastings et al. | July 29, 1954 |
| 2,756,627 | Boychs | July 31, 1956 |
| 2,803,755 | Melford | Aug. 20, 1957 |
| 2,866,376 | Cook | Dec. 30, 1958 |
| 2,868,059 | Summerhayes | Jan. 13, 1959 |
| 2,910,908 | Meyer | Nov. 3, 1959 |
| 2,930,228 | Lawrence et al. | Mar. 29, 1960 |

OTHER REFERENCES

Metal Progress, May 1936, pages 35–38.